United States Patent [19]
Brown et al.

[11] Patent Number: 4,759,269
[45] Date of Patent: Jul. 26, 1988

[54] AIRCONDITIONING CONTROL SYSTEM FOR AN AUTOMOTIVE VEHICLE

[75] Inventors: Kenneth G. Brown, Milford; Richard C. Berry, Westland; William W. Boddie, Ann Arbor; Louis E. Colombo, Chelsea, all of Mich.

[73] Assignee: Ford Motor Company, Dearborn, Mich.

[21] Appl. No.: 945,154

[22] Filed: Dec. 22, 1986

[51] Int. Cl.⁴ .............................................. B60H 1/00
[52] U.S. Cl. ..................................... 98/2.01; 165/22; 165/42
[58] Field of Search ................ 98/2, 2.01, 2.11; 165/22, 42, 43

[56] References Cited

U.S. PATENT DOCUMENTS

| | | | |
|---|---|---|---|
| 2,860,567 | 11/1958 | Wilfert | 98/2.06 |
| 4,375,754 | 3/1983 | Okura | 165/43 X |
| 4,426,852 | 1/1984 | Nishimura et al. | 165/43 X |
| 4,434,932 | 3/1984 | Hara et al. | 98/2.01 |
| 4,460,036 | 7/1984 | Yoshimi et al. | 98/2.05 X |
| 4,482,009 | 11/1984 | Nishimura et al. | 98/2.01 X |
| 4,537,245 | 8/1985 | Nishimura et al. | 165/22 |
| 4,586,652 | 5/1986 | Sakurai | 98/2.01 X |
| 4,602,675 | 7/1986 | Kubayashi | 165/43 X |
| 4,665,971 | 5/1987 | Sakurai | 165/22 |

Primary Examiner—Harold Joyce
Attorney, Agent, or Firm—Jerome R. Drouillard; Roger L. May

[57] ABSTRACT

An airconditioning control system for an automotive vehicle includes a flow control responsive to individual inputs from multiple locations within the motor vehicle for providing conditioned air processed by a blower, an evaporator and a heater, with air being provided at selected flow rates to each of the locations, with each of the flow rates being independent of the other.

23 Claims, 5 Drawing Sheets

AIRCONDITIONING CONTROL SYSTEM FOR AN AUTOMOTIVE VEHICLE

BACKGROUND OF THE INVENTION

1. Field of the Invention

This invention relates to an airconditioning control system for use with an automotive vehicle.

2. Disclosure Information

The design of automotive airconditioning control systems presents a variety of problems to the engineer. For example, the temperatures at which individual passengers feel comfortable while occupying the vehicle may diverge widely. This divergence is due in some cases to external influences such as solar load, air leaks, or conduction through various surfaces within the vehicle. Comfort of individual passengers may also be affected by individual preferences and also by differences in dress. These problems are compounded within the automotive environment by low availability of space in which to place airconditioning componentry.

Further problems arise from the fact that vehicle occupants sit in close proximity to the air discharge registers. Thus the incoming airflow "blows" upon the face or other parts of the body. Some motorists object to this phenomenon, whereas others do not. It has been found, therefore, that independent control of the quantity of airflow reaching a driver and any passengers will materially increase the ability of an airconditioning system to satisfy the individual needs of the driver and passengers.

In a conventional automotive airconditioning control system, a single blower is combined with a single evaporator core and a single heater core. A control panel operated by the driver of the vehicle is set to determine blower speed, desired discharge air temperature and desired air discharge location. Typically, one or more registers are provided, which registers may be controlled by the driver and passengers to either reduce or eliminate the flow of conditioned air impinging upon either the driver or the passengers. Such systems do not, however, provide independently controllable airflows to the driver and passenger because closing or opening of the various registers will cause more or less air to be discharged from the remaining registers. In other words, the flows through the various register openings are cross-coupled. The present invention eliminates this cross-coupling without the necessity for additional blowers or heater cores or airconditioning evaporators.

Designers seeking to provide automotive airconditioning control systems capable of creating a comfortable climate for more than one vehicle occupant have developed several types of dual or multizone control systems. An example of an early dual control system is found in U.S. Pat. No. 2,860,567 in which separately operable controls are provided for a driver and passenger of a motor vehicle. This system includes a separate heat exchanger for each zone of operation and functions essentially as two separate systems.

Several examples of multizone airconditioning control systems are disclosed in U.S. Pat. Nos. 4,460,036; 4,537,245; and 4,482,009. Each of these patents describes a system having the capability for individual temperature control for two or more zones, but each lacks the ability to independently change the airflow delivered to two or more zones. More specifically, each of these systems uses a manually operated blower control which will not allow independent change of airflow rates to two separate zones of operation.

U.S. Pat. Nos. 4,426,852, 4,434,932, and 4,375,754 disclose airconditioning control systems in which the direction of flow of conditioned air is shifted depending upon which seats in the motor vehicle are occupied. Although providing selective delivery to more than one zone, these systems do not provide independent control for airflow rate to two or more zones of operation with a single blower because an increase in airflow rate for one zone at a constant blower speed will be accompanied by a reduction of airflow in all other zones.

It is an object of the present invention to provide an airconditioning control system for an automotive vehicle with the capability of supplying conditioned air at independently variable flow rates to at least two separate zones of operation within the automotive vehicle with the use of a single blower means.

It is a further object of the present invention to provide an airconditioning control system for an automotive vehicle in which not only airflow rate, but also desired discharge air temperature, and desired location of air discharge may be varied independently for at least two separate zones of operation of the vehicular climate control system.

It is yet another object of the present invention to provide an airconditioning control system which avoids cross-coupling between the airflows provided to at least two independent zones of operation within the automotive vehicle. This is particularly important during the transitions which occur when one but not all of the vehicle's occupants has called for a greater or lesser airflow rate.

It is an advantage of the present invention that independent airflow rates may be provided to at least two independently operable zones with a single air supply blower, a single evaporator core, and a single heater core.

It is yet another object of the present invention to provide an airconditioning control system for an automotive vehicle in which at least two control panels are used to provide individual inputs from a driver and passenger of the vehicle to a system having a single blower, evaporator core and heater core.

SUMMARY OF THE DISCLOSURE

In accordance with this invention, an airconditioning control system for an automotive vehicle comprises an air supply blower, an evaporator core, a heater core, and flow control means responsive to individual inputs from multiple locations within the motor vehicle for providing conditioned air processed by the blower, evaporator and heater, with the air being provided at selected flow rates to each of said multiple locations, and with each of said flow rates being independent of the other. A preferred flow control means comprises speed governing means for controlling the speed at which the blower operates, diverter means for proportioning the output of the blower according to individual inputs from multiple locations within the vehicle, and microprocessor means for interactively operating the speed governing means and the diverter means in response to said individual inputs from multiple locations of the vehicle, such that conditioned air may be supplied to the multiple locations at independent flow rates.

Preferably, the microprocessor means comprises means for receiving individual inputs from the multiple locations and means for determining the appropriate speed level for the blower and an appropriate operational setting for the diverter means. The microprocessor means preferably further comprises means for determining a time phased relationship between changes in the power level of the blower and the operational setting of the diverter means. The preferred microprocessor means is equipped to operate the speed governing means and the diverter means in response to individual inputs from the multiple locations relating to airflow rates and temperature or direction of discharge airflow.

Preferably, the diverter means comprises a flow divider for dividing the output of the blower between a plurality of air distribution systems leading to said multiple locations. A preferred flow divider comprises a single motor operated door positioned downstream from the blower but upstream from the evaporator core and the heater core. In the event that design considerations dictate otherwise, the flow divider means may comprise at least two motor operated doors positioned downstream from the blower, the evaporator core, and the heater core.

A preferred method for supplying conditioned air at independent flow rates to multiple locations within a motor vehicle in accordance with the invention comprises: reading individual inputs from each of the multiple locations of the motor vehicle, where each of the inputs corresponds to a desired airflow rate; adjusting the speed of a single blower employed for the purpose of supplying the interior of the vehicle with conditioned air in response to said inputs; and apportioning the output of the blower, based upon the inputs from the multiple locations, between a plurality of air distribution systems for supplying conditioned air to the multiple locations. The input signals from the multiple locations preferably comprise signals corresponding to the desired airflow rate, desired discharge air temperature, and desired air discharge location.

In another preferred embodiment of the present invention, an air conditioning control system for an automotive vehicle preferably comprises input means for receiving individual inputs from multiple locations within an automotive vehicle, with the inputs corresponding to at least desired individual airconditioning airflow rates for the multiple locations, with the input means further comprising means for generating individual input signals in response to the inputs from the multiple locations. The airconditioning control system of this embodiment further comprises register means for reading individual input signals from the multiple locations, blower speed control means for adjusting the speed of a blower supplying conditioned air to the multiple locations, and diverter means for apportioning the output of the blower between a plurality of air distribution systems for supplying conditioned air to the multiple locations. The diverter means is responsive to the individual input signals from the multiple locations. An airconditioning control system according to this embodiment preferably further comprises a plurality of separate control panel means with one control panel means operable to select the desired operating conditions within each of the multiple locations. At the option of the vehicle's designer, however, the system may be controlled by a single panel operable by both the driver and the passengers, in order to allow each to make independent selection of not only airflow rate, but also desired discharge air temperature and desired air discharge location.

DESCRIPTION OF THE PREFERRED EMBODIMENTS

Figure 1:
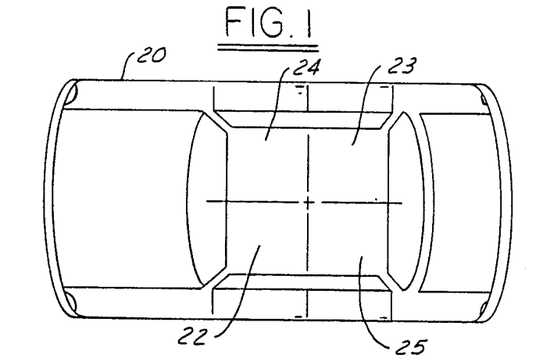
FIG. 1 is a schematic plan view of a motor vehicle having multiple locations of operation for an airconditioning control system according to the present invention.

As shown in FIG. 1, an airconditioning control system in accord with the present invention is intended for use in a multizone configuration in an automotive vehicle. According to the present invention an airconditioning system will provide conditioned air at a first flow rate to a driver occupying zone 22 and conditioned air at a second, independent flow rate, to one or more passengers occupying zone 24 of the motor vehicle. At the option of the airconditioning system designer, conditioned air may be supplied at independent flow rates to two additional zones, shown as 23 and 25 in FIG. 1.

Figure 2:
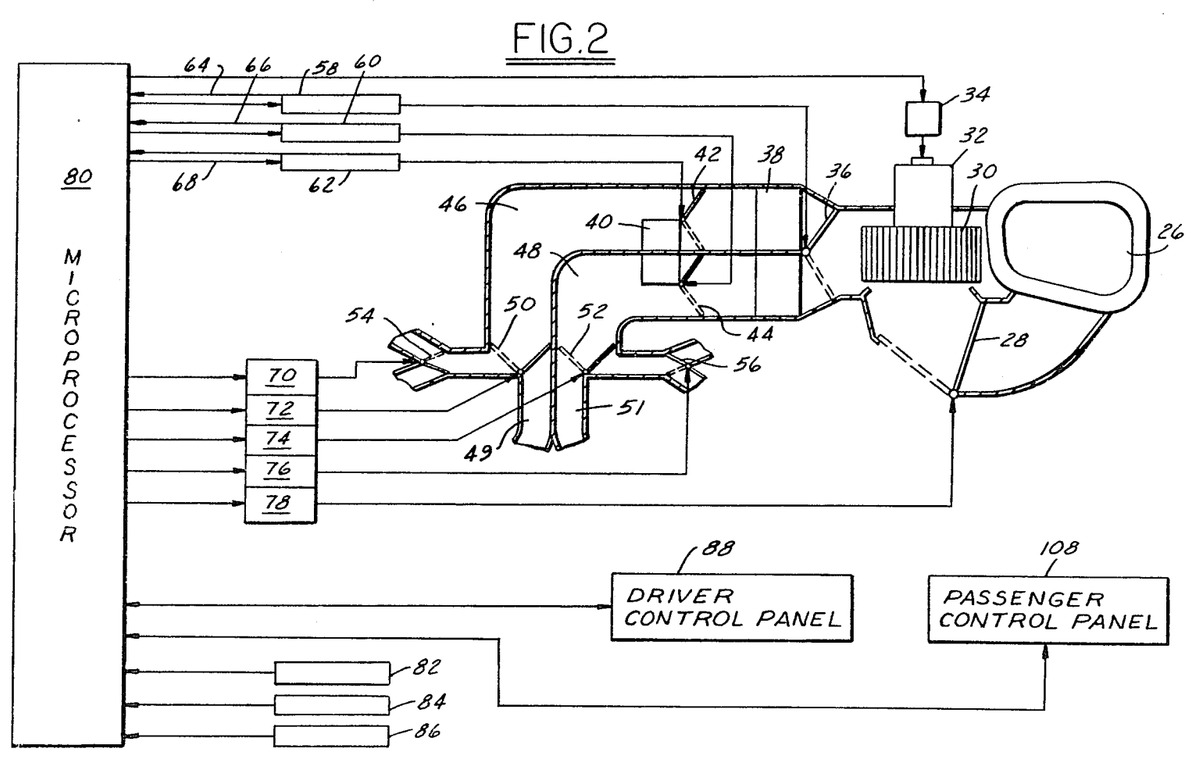
FIG. 2 is a schematic representation of an airconditioning control system according to the present invention, including dual control panels for the driver and passengers of an automotive vehicle.

Several details of one preferred embodiment of an airconditioning control system according to the present invention are shown in FIG. 2. Air is admitted into the vehicle passenger compartment from the outside via air inlet 26 and progresses to recirculation door 28. The function of recirculation door 28 is to either allow air to be drawn from the atmosphere outside the vehicle, or from the interior of the vehicle, depending upon the operating mode selected by the driver. For example, in the event that maximum airconditioning is required, recirculation door 28 will be set and positioned so as to cause substantially all of the air flowing past blower 30 to be withdrawn from the passenger compartment rather than from air outside the vehicle.

Air is drawn into air inlet 26 and pushed through the balance of the airconditioning system by means of blower 30 which is driven by blower motor 32. The speed of blower motor 32 is controlled by blower speed control 34 in response to commands from microprocessor 80. Air discharged by blower 30 is passed downstream to diverter door 36 which is operated by microprocessor 80 through actuator 58. The actuator is interactively connected with microprocessor 80 by means of feedback loop 64.

Diverter door 36 functions as a flow divider for splitting the output of blower 30 between a first air distribution system leading to the space occupied by the driver and a second air distribution system leading to the space occupied by the passenger or passengers. The first air distribution system comprises in part driver duct 46, whereas the second air distribution system comprises in part passenger duct 48.

Figure 6:
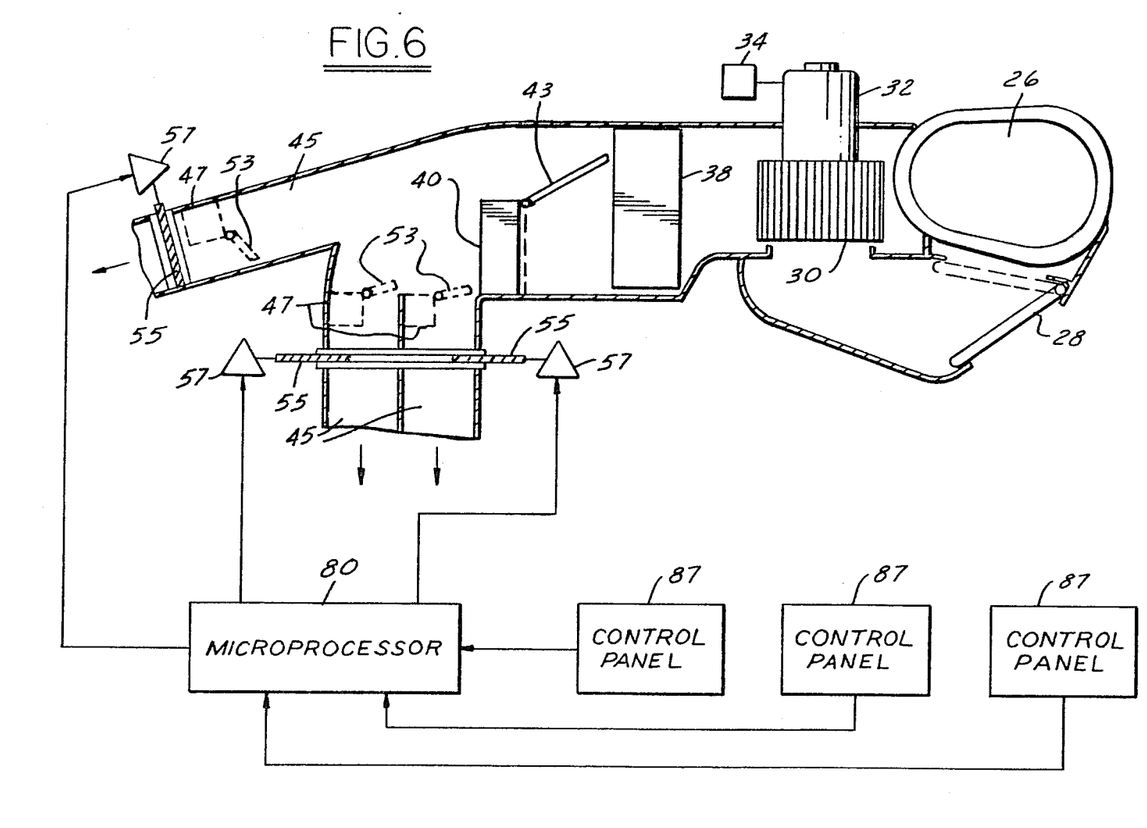
FIG. 6 is a schematic representation of a second embodiment of an airconditioning control system according to the present invention.

In the event that individual control of temperature is not required for a multiple location system constructed according to the present invention, the flow divider may comprise at least two motor operated doors positioned downstream from the blower, the evaporator core, and the heater core. This type of system architecture is shown in FIG. 6. Using this architecture, it is possible to utilize the present invention to build a multizone system having two, three, or more zones, with each having independent control of airflow rate.

Returning to FIG. 2, the interaction between blower 30 and diverter door 36 will be explained at length in connection with the logic block diagram shown in FIG. 3.

Air moving past diverter door 36 flows through evaporator core 38 which functions according to well known principles of automotive airconditioning practice. As noted in FIG. 2, evaporator core 38 has a bulkhead running through its center so that the flows through driver duct 46 and passenger duct 48 do not become intermixed.

Air moving downstream from evaporator core 38 moves past driver blend door 42 and passenger blend door 44. The blend doors function to channel air in their respective ducts either through heater core 40, or around heater core 40. Accordingly, the temperature of chilled air which has passed through evaporator core 38 may be adjusted by causing some or all of the airstream passing through the duct to be caused to pass through heater core 40. As is the case with evaporator core 38, the heater core has a bulkhead dividing its air side to prevent intermixing of the airstreams in the driver and passenger ducts.

The driver and passenger blend doors are operated by microprocessor 80 through actuators 62 and 60, respectively. As before, the actuators include feedback loops 66 and 68 through which the positions of the blend doors are communicated to the microprocessor.

Air moving through driver duct 46 past heater core 40 impinges after a brief passage upon driver mode door 50 which is operable to direct the flow of air upon the floor of the vehicle in the driver's area, in which case the air will go through driver floor duct 49. Alternatively, the air may be directed to driver panel/defrost door 54, which allows the air flowing through driver duct 46 to impinge ultimately upon either the windshield of the vehicle or upon the driver via instrument panel registers, which although not shown, are well known to those skilled in the art to which this invention pertains.

Downstream flow control of conditioned air passing through passenger duct 48 is similar to that previously described for driver duct 46. Accordingly, air flowing past passenger mode door 52 may be discharged either upon the passenger's floor area through passenger floor duct 51 or the air may be allowed to impinge upon the windshield or from instrument panel registers, as directed by passenger panel/defrost door 56.

Doors 50, 52, 54 and 56 are operated by microprocessor 80 through actuators 70, 72, 74 and 76. Recirculation door 28 is operated by microprocessor 80 through actuator 78. Those skilled in the art will appreciate that in view of this disclosure that any of the known means for operating the various flow control doors may be employed in various embodiments of this invention. For example, vacuum motors, stepper motor driven linkage mechanisms, other motor designs or flow control door designs could be employed with this invention. Similarly, those skilled in the art will appreciate in view of this disclosure that other types of blowers other than the familiar squirrel cage shown in FIG. 2, such as axial flow devices, could be employed. It will also be appreciated in view of this disclosure that other types of heater blend door configurations and downstream flow governing means could be employed with the present invention.

Figure 7:
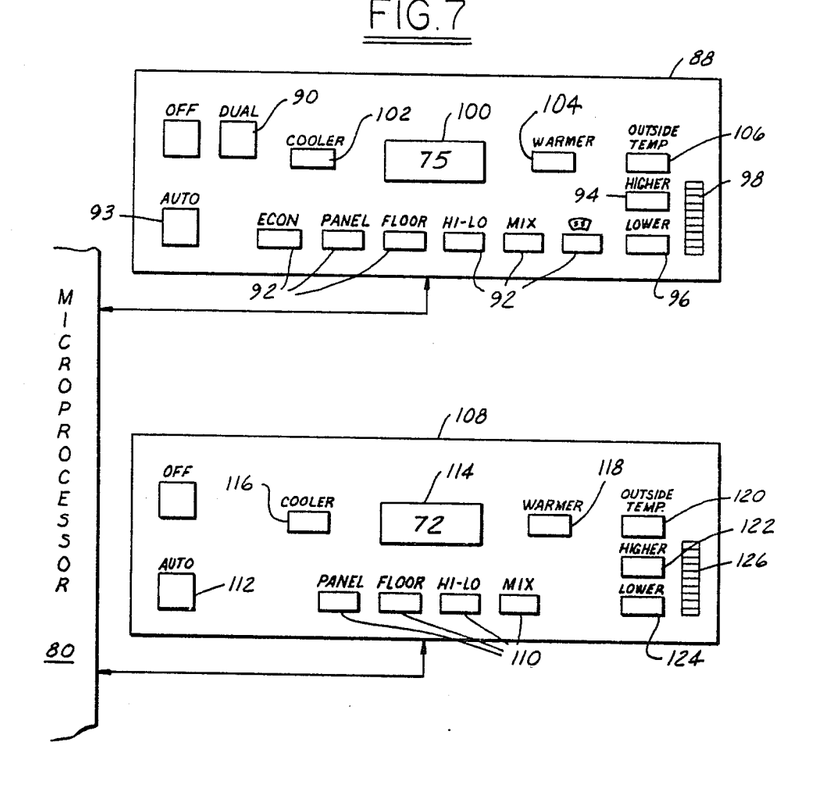
FIG. 7 is a partially schematic representation of driver and passenger control panels appropriate for use with an embodiment of this invention.

Separate driver and passenger control panels are shown in the embodiment of FIG. 2, and in detail in FIG. 7. These control panels comprise input means for receiving individual inputs from the driver and a passenger of the vehicle, with the inputs corresponding to at least desired individual airconditioning airflow rates for the driver and the passenger. The control panels further comprise means for generating individual input signals in response to the inputs from the driver and passenger. Driver control panel 88 comprises dual operating mode switch 90 which allows the driver to specify that the system operate in either a conventional manner or in the manner of this invention in which the driver and passenger have independent control over airflow rate, desired discharge air temperature and desired air discharge location. Mode switches 92 allow the driver to operate the system in several different modes such as economy, in which outside air is admitted into the vehicle without operating the airconditioning compressor, a panel mode in which air is discharged from the instrument panel registers, a floor mode in which air is discharged from driver floor duct 49, a high/low mode in which air is discharged from driver floor duct 49 and also through instrument panel registers, and mixed mode in which air is discharged through floor duct 49 and upon the windshield as well. An additional mode is defrost mode in which all air is caused to impinge upon the windshield. In the event that the driver selects the defrost mode, the passenger control panel will be overridden so that all of the air flowing through the airconditioning system will be directed upon the windshield.

The driver controls airflow solely through his duct whenever the dual operating mode has been selected, or through both the driver duct and the passenger duct when dual mode is not in operation.

Airflow rate is set by the driver by means of airflow switches 94 and 96. Airflow switch 94 provides for greater airflow, whereas airflow switch 96 provides for lesser airflow. To operate these switches the driver merely depresses the appropriate switch until light emitting diode (LED) display 98 indicates the desired airflow rate.

The driver employs digital temperature display 100 and temperature controlling switches 102 and 104 to independently increase or decrease the desired discharge air temperature for his zone of the airconditioning system. The driver decreases or increases the desired discharge temperature by pressing temperature decreasing switch 102 or temperature increasing switch 104, respectively. Although digital temperature display 100 normally indicates the temperature of the driver's operating zone, this display will selectively indicate the temperature outside the vehicle, upon manipulation of switch 106.

Passenger control panel 108 is similar to driver control panel 88 but contains fewer functions because the driver panel is considered to be the master control panel. Both the driver and passenger control panels contain auto switches which allow the air conditioning control system to operate in an automatic mode wherein a set temperature will be maintained without intervention by the driver or passenger. The passenger control panel contains a digital temperature display and temperature decrease and increase switches 116 and 118 in the same fashion as the driver control panel. Similarly, by manipulation of air flow control switches 122 and 124 and through observation of LED air flow display 126, the passenger may independently control his airflow rate. Finally, mode switches 110 are included in the passenger control panel. These switches function in the manner previously described for the driver's mode switches.

Ambient temperature sensor 82, interior temperature sensor 84 and coolant temperature sensor 86 (FIG. 2) interact with microprocessor 80. Those skilled in the art will appreciate in view of this disclosure that these sensors may be employed in a variety of control schemes in which their functions are similar to the functions of such sensors in known systems. Accordingly, the ambient temperature sensor may be employed, as an example, for the purpose of advising the microprocessor whether outside air must be heated or cooled in order to bring the temperature inside the vehicle, as measured by interior temperature sensor 84, to a desired level. As a further example, coolant temperature sensor 86 may be employed to advise the microprocessor whether sufficient heat is available from the engine's coolant to heat air before it is introduced into the passenger compartment.

Figure 4:
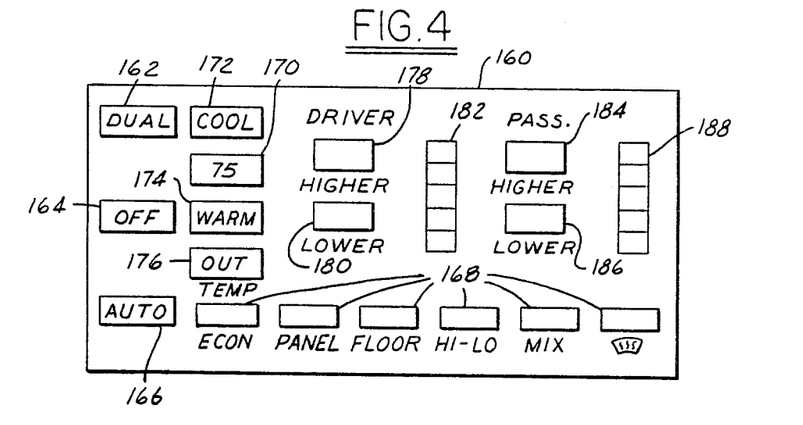
FIG. 4 is a partially schematic representation of a single control panel appropriate for use with an embodiment of this invention.

FIG. 4 shows combined driver/passenger control panel 160 which may be used by either a driver or passenger of a motor vehicle to independently control airflow rate to zones occupied by the driver and any passenger of the motor vehicle. Dual command mode switch 162 allows a dual mode or a single command mode in which the driver control predominates. As before, auto switch 166 places the unit in automatic temperature control mode. Mode switches 168 function to direct conditioned air to the desired location. As before, digital temperature display 170 and temperature adjustment switches 172 and 174 allow an operator of control panel 160 to increase or decrease desired discharge air temperature.

Dual controls are provided in panel 160 for providing independent airflow rates to the driver and passenger. Accordingly, driver airflow switches 178 and 180 and passenger airflow switches 184 and 186 are provided. As before, LED readouts 182 and 188 disclose to the driver and passenger respectively the rates of discharge airflow.

Those skilled in the art will appreciate in view of this disclosure that microprocessor 80 and its Peripheral equipment could be structured according to several different architectures. In a preferred embodiment, however, microprocessor 80 is configured so that a control program is sequentially read for each unit command from a read-only memory (ROM) which stores preset control programs. Unit commands are executed by a central processing unit (CPU). The microprocessor integrally includes an input-output control circuit (I/O) for exchanging data with external devices and a random access memory (RAM) for temporarily holding data while the data are being processed. The RAM and the I/O thus comprise register means for receiving individual input signals from the driver and passenger controls, whereas the ROM and the CPU comprise means for determining an appropriate power level for the blower and an appropriate operational setting for the diverter door. The ROM and the CPU further comprise means for determining a time phased relationship between changes in the power level of the blower and the operational setting of the diverter door. Each of these functions will be explained in greater detail hereinafter.

Those skilled in the art will further appreciate in view of this disclosure that microprocessor 80, diverter door 36, and blower speed control 34 thus comprise flow control means responsive to the individual inputs from the driver and passenger for providing independent airflows to each.

Figure 3:
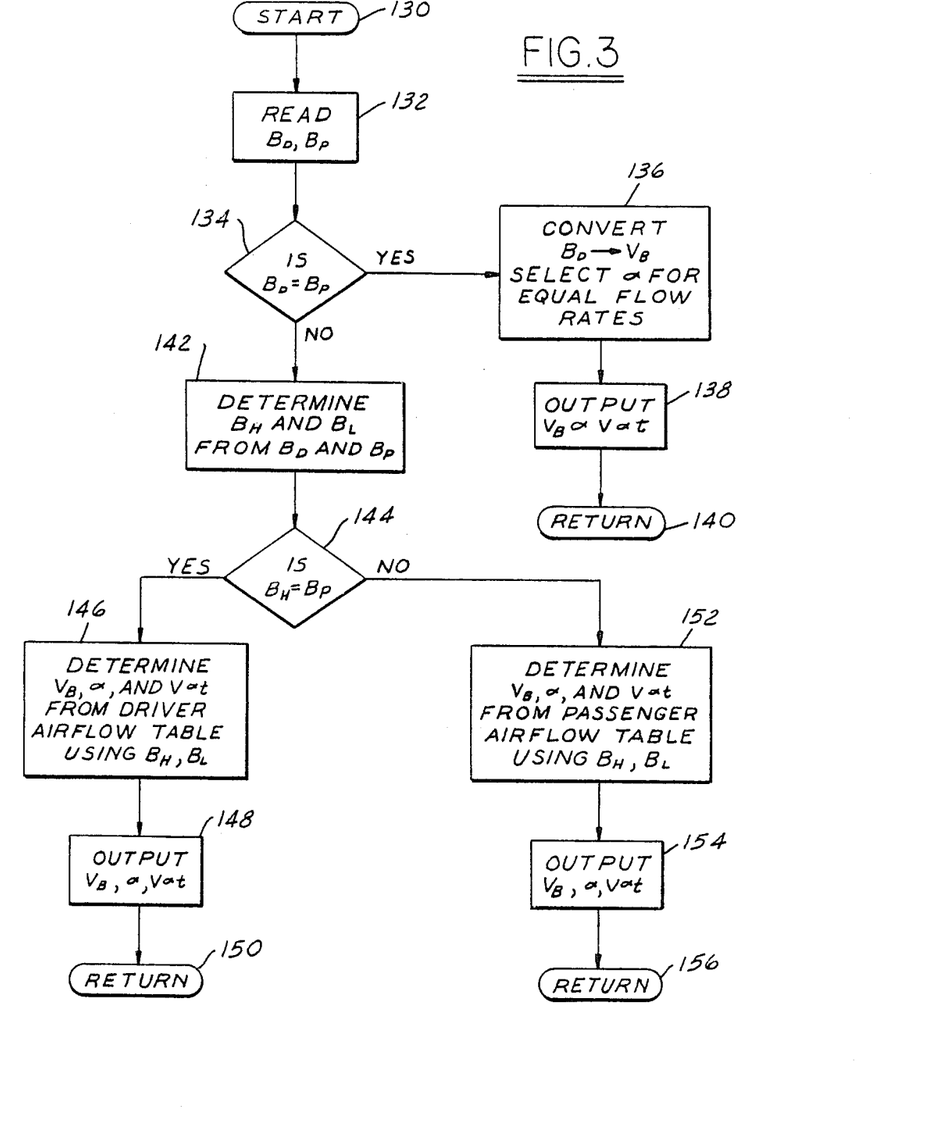
FIG. 3 contains a logic flow block diagram in accordance with an embodiment of this invention.

FIG. 3 contains a simplified logic flow diagram for the subroutine which controls the operation of diverter door 36 and blower speed control 34. The subroutine begins at block 130 with the start of the program. After the program is started block 130 transfers to block 132 where $B_D$ and $B_P$ are read. $B_D$ is a signal which corresponds to the driver's desired airflow rate as set in driver control panel 88, whereas $B_P$ is a signal which corresponds to passenger desired airflow rate as set at control panel 108.

Transferring to block 134, the program compares $B_D$ to $B_P$. If $B_P$ is equal to be $B_D$, this indicates to the computer that the driver and passenger desire the same airflow and the program transfers to block 136 wherein the command is given to convert $B_D$ to a blower voltage signal, $V_B$. After converting $B_D$ to $V_B$, the computer at block 136 also selects a diverter door opening angle, $\alpha$, to obtain equal flow rates for both the driver and the passenger. This angle may not be equal to that angle which would set the diverter door 36 in a position wherein it is perfectly aligned with the divider in the middle of evaporator 38, it being understood to those skilled in the art that the restriction to airflow posed by driver duct 46 and passenger duct 48 may not be equal. Accordingly, it may be necessary to bias diverter door 36 in a direction favoring either driver duct 46 or passenger duct 48 in order to achieve equal airflows through each of the ducts.

The necessity of biasing diverter door 36 to achieve equal airflow rates to each of two zones of operation may be determined through empirical performance studies of the system under consideration. Once the performance of a system has been quantified, the necessary data may then be entered into a look-up table positioned within the microprocessor's ROM.

Figure 5:
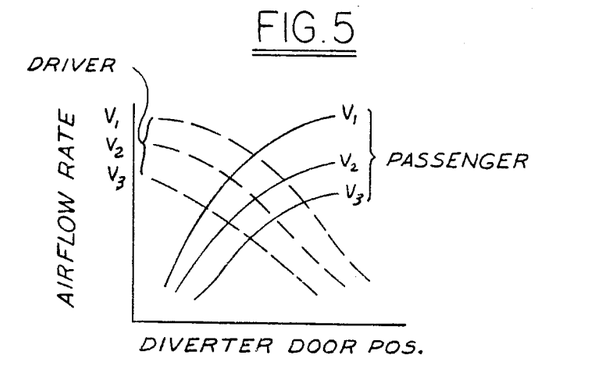
FIG. 5 is a graphical representation of several performance curves which are related to the operation of a system according to one embodiment of the present invention.

Other data stored within the ROM include performance curves for blower 30 and diverter door 36. A schematic representation of such curves is shown in FIG. 5. In order to obtain necessary data for a lookup table, a family of curves must be determined either experimentally or analytically. Those skilled in the art will appreciate in view of this disclosure that there are several means for obtaining the necessary data for a lookup table.

As shown in FIG. 5, curves are plotted for various blower voltages, $V_{1-3}$. Each curve shows, at a constant blower voltage corresponding to a constant blower speed, the change in airflow rate for either the driver or the passenger as a function of the position of diverter door 36. Thus, when data are picked from the curves and entered into a lookup table within the ROM, the microprocessor will know, for a given diverter door position and blower voltage, the air flow rate offered to both the passenger and the driver. This will enable the computer to select an appropriate blower voltage and diverter door position, α.

Returning now to the flow chart contained in FIG. 3, the computer transfers from block 136 to 138 and outputs blower voltage signal $V_B$, diverter door position signal, α, and a phase signal $V_{αt}$. The phase signal is necessitated by inertia contained within the airconditioning system. Each of the signals is output through an I/O system to the appropriate part of the airconditioning system. For example, $V_B$ is output to blower speed control 34 in order to adjust the speed of blower motor 32, and α is output to actuator 58 in order to set the position of diverter door 36.

The $V_{αt}$ signal accounts for inertia within the airconditioning system in the following manner. If, for example, both the driver and the passenger have set each of their control panels to call for moderate airflow, but then the driver decides to call for a lower airflow rate, both the blower voltage signal $V_B$ and diverter door position α must be adjusted. Blower voltage must be decreased to allow the driver's airflow rate to decrease, whereas diverter door 36 must be biased in a direction tending to favor airflow to the passenger. The necessity of performing both of these adjustments stems from the following considerations. First, if the diverter door position were not changed, and the driver's lessened airflow requirement were satisfied merely by lowering the blower voltage, the lessened blower voltage (and blower speed) would reduce the airflow rates to both the driver and to the passenger. Thus, it has been established, for the sake of this example, that blower voltage must be reduced to decrease driver airflow and this action must be counteracted, on behalf of the passenger, by adjusting the position of the diverter door to favor the passenger's airflow. A second consideration is that merely changing the position of diverter door 36 to reduce the driver's airflow will produce a cross-coupling effect with the passenger's airflow because the passenger's airflow will be caused to increase because of the diverter door's new position, even without any command from the passenger for such an increase. Accordingly, blower voltage and diverter door position α must be controlled together in order to avoid the cross-coupling effects the present invention is intended to eliminate. It is for these reasons that the microprocessor must control the diverter door and blower speed interactively.

Returning to the explanation of $V_{αt}$, and using the same example in which the driver and passenger are each at a high flow rate and the driver wishes to reduce his flow rate, in the event that blower voltage is reduced at one instant and at the same instant the diverter door is moved to a new position favoring the passenger's airflow, the passenger could feel a puff of air because the instantaneous reduction of blower voltage will not instantaneously reduce the output of the blower, it being understood that the blower has rotating inertia which must be overcome by the friction of the blower's bearings and by energy absorbed by the blower. Accordingly, to avoid an undesirable transient response, e.g., a puff of air, an instantaneous change in blower voltage should not be accompanied by instantaneous opening of diverter door 36 in favor of the passenger. Rather, the position of the diverter door should be, and is, in accord with this invention, changed a finite time after the blower voltage is reduced. The diverter door position is therefore not changed until the blower has assumed a new, correct, speed corresponding to the value for $V_B$ selected from the ROM lookup table. In this manner, a puff of air will not be expelled from the passenger's distribution duct.

Following block 138, the computer transfers to block 140 and returns to the start position at block 130. The microprocessor will cycle through the subroutine shown in FIG. 3 several times per second depending upon the desired time base of operation.

Continuing once again from block 130 through blocks 132 and 134, in the event that $B_D$ is not equal to $B_P$, in other words, if the requested driver and passenger airflow rates are not equal, the computer transfers to block 142 wherein $B_D$ and $B_P$ are compared and sorted into $B_H$ and $B_L$. $B_H$ is a signal corresponding to the higher of the two airflow rate requests, whereas $B_L$ is a signal corresponding to the lower of the two airflow rate requests. Having performed the comparison of block 142, the computer transfers to block 144 where $B_H$ and $B_P$ are compared. If $B_H$ is not equal to $B_P$, the computer transfers to block 152 wherein $V_B$, α, and $V_{αt}$ are determined from a passenger airflow lookup table using variables $B_H$ and $B_L$.

After having determined $V_B$, α, and $V_{αt}$ at block 152 the computer transfers to block 154 wherein $V_B$, α, and $V_{αt}$ are output. As before, $V_B$ will adjust blower speed, α will adjust the position of the diverter door to apportion the total airflow between the driver and passenger ducts, and $V_{αt}$ will determine the time phase relationship between the change in blower speed and the change in the diverter door position. The computer then transfers to block 156 where it returns to the start position at block 130.

Beginning again at block 144, in the event that $B_H$ is equal to $B_P$, computer transfers to block 146 wherein $V_B$, α and $V_{αt}$ are determined from driver airflow lookup table using $B_H$ and $B_L$. As an example of the determination performed in block 146, in the event that the passenger desires greater airflow than the driver, the blower voltage must be selected to be sufficiently high to give the passenger the airflow rate he desires, whereas the diverter door must be positioned in such a fashion so as to restrict the flow to the driver so that he will receive only the air requested at his control panel. Interactive control by microprocessor 80 of blower voltage, which determines blower speed, and diverter door position, α, will enable these requirements to be met.

Once the determination is made in block 146, the computer moves to block 148 wherein $V_B$, α and $V_{αt}$ are output to blower speed control 34 and diverter door actuator 58. The computer then returns at block 152 to start of the subroutine of block 130. Those skilled in the art will appreciate in view of this disclosure that detail of only the subroutine shown in FIG. 3 has been provided herein, it being understood that the balance of the present control system will be structured according to the dictates of the system designer.

As noted above, a principle advantage of the present system is the ability to avoid cross-coupling between the driver and passenger airflows. In some systems, achievement of this advantage may require the provision of additional entries in the lookup table to account for operation of driver blend door 42 and passenger blend door 44. Such additional entries may be necessary in the event that operation of either of the blend doors results in the imposition of a significant pressure drop within the duct in which the blend door operates. As an example, driver duct 46 may offer a significantly greater restriction to airflow whenever blend door 42 is in a position to cause all of the air passing through driver duct 46 to pass through heater core 40. Conversely, minimum restriction is offered by driver duct 46, at least regarding blend door 42, when the blend door is positioned so as to cover access to heater core 40. The effect of blend door operation, then, may be accounted for within the previously described lookup tables to further reduce cross-coupling between the driver and passenger ducts. Moreover, in the event that operation of the mode and panel defrost doors produces objectionable cross-coupling effects, these effects may also be countered by introducing additional lookup table entries. Those skilled in the art will appreciate in view of this disclosure that the need for compensation for operation of the mode and panel-defrost doors and blend doors may be determined either through empirical studies, or through modeling of the system.

A second preferred embodiment of the present invention is shown in FIG. 6. For the sake of clarity, the reference numerals from FIG. 2 have been retained to the extent possible. Accordingly, an airconditioning control system has air inlet 26, recirculation door 28, blower 30 driven by blower motor 32, and evaporator core 38. A single heater core, 40, may be employed with a single blend door 43. Alternatively, a plurality of individual duct heater cores 47 may be deployed, with each core having an individual duct blend door 53.

In the event that a single heater core 40 is used, the multiple locations within the vehicle will have independently controllable airflow rates, but independent control of temperature will not be possible. Independent control of both airflow rate and temperature may be provided, however, by the use of the individual duct heater cores 47, individual duct blend doors 53, and a plurality of motor operated downstream distribution doors 55 which control the flow through a plurality of distribution ducts 45.

According to the embodiment shown in FIG. 6, individual inputs from multiple locations within the vehicle may be registered upon a plurality of control panel means, 87. Each control panel 87 comprises means for selecting airflow rate and desired discharge air location. As noted above, however, in the event that independent control of discharge air temperature is desired, the control panels will further comprise means for selecting desired discharge air temperature. Once the selections have been entered at each of the control panels 87, the plurality of motor operated doors 55 will divide the flow provided by blower 30. As previously described, microprocessor 80, will interactively control the blower speed and the positions of each of the downstream distribution doors 55 to effect the independent control of airflow rate to each of the multiple locations.

Those skilled in the art will appreciate in view of this disclosure that the airconditioning control system shown in FIG. 6 will have the full complement of sensors and controls shown in FIG. 2, it being understood that the functions of the various sensors are unchanged from those previously explained. Similarly, the function of the microprocessor to control the various air control doors will be as before, with a principal difference arising from the need to control three separate air distribution systems. This will necessitate provision of a lookup table within the ROM which will account for the interaction of the multiple downstream distribution doors, the blower, and the individual duct blend doors, whereas with the embodiment shown in FIG. 2, only a single diverter door needed to be controlled, along with the other components. Finally, it should be understood that those portions of the air distribution systems extending downstream from the downstream distribution doors may either be configured as shown in FIG. 2, or according to alternate configurations where the interior design of a particular vehicle in question so requires.

Although FIG. 6 depicts an airconditioning control system having three air distribution systems, it should be understood that any number of air distribution systems could be employed according to the present invention.

Various modifications and variations will no doubt occur to those skilled in the various arts to which this invention pertains. For example, the computer architecture described herein may be modified according to the individual needs of the system being designed. Also the arrangement of the various flow control doors, heater core and evaporator core may be altered according to the dictates of the particular system under consideration. As another example, those skilled in the art will appreciate that the present invention could be practiced in a system employing only a heater core, or only an evaporator core, depending upon the climatic conditions in which the automotive vehicle is intended to be operated. These and all other variations which basically rely on the teachings with which this disclosure has advanced the art are properly considered within the scope of this invention as defined by the appended claims.

We claim:

1. An airconditioning control system for an automotive vehicle comprising:
    a single air supply blower;
    an evaporator core;
    a heater core;
    flow control means responsive to individual inputs from multiple locations within said motor vehicle for providing conditioned air processed by said blower, said evaporator core, and said heater core, at selected flow rates to each of said locations, with said flow rates each being independent of the other.

2. An airconditioning control system according to claim 1 wherein said flow control means comprises:
    speed governing means for controlling the speed at which said blower operates;
    diverter means for apportioning the output of said blower according to said individual inputs from said multiple locations; and
    microprocessor means for interactively operating said speed governing means and said diverter means in response to said individual inputs from said multiple locations such that conditioned air may be supplied to said multiple locations at independent flow rates.

3. An airconditioning control system according to claim 2 wherein said microprocessor means comprises:
    means for receiving said individual inputs from said multiple locations; and
    means for determining an appropriate power level for said blower and an appropriate operational setting for said diverter means.

4. An airconditioning control system according to claim 3 wherein said microprocessor means further comprises means for determining a time phased relationship between changes in the power level of said blower and the operational setting of said diverter means.

5. An airconditioning control system according to claim 3 further comprising a plurality of control panel means, with one such control panel means corresponding to each of said multiple locations, with each of said control panel means comprising means for selecting airflow rate and desired discharge air temperature.

6. An airconditioning control system according to claim 5 wherein each of said control panel means comprises control means for selecting airflow rate and desired discharge air temperature and desired discharge air location.

7. An airconditioning control system according to claim 2 wherein said microprocessor means operates said speed governing means and said diverter means in response to individual inputs from said multiple locations relating to airflow rate and temperature.

8. An airconditioning control system according to claim 2 wherein said microprocessor operates said speed governing means and said diverter means in response to individual inputs from said multiple locations relating to airflow rate, temperature, and direction of flow.

9. An airconditioning control system according to claim 2 wherein said diverter means comprises a flow divider for dividing the output of said blower between a plurality of air distribution systems leading to said multiple locations.

10. An airconditioning control system according to claim 9 wherein said flow divider comprises a motor operated door positioned downstream from said blower, but upstream from said evaporator core and said heater core.

11. An airconditioning control system according to claim 9 wherein said flow divider comprises a plurality of motor operated doors positioned downstream from said blower, said evaporator core, and said heater core.

12. A method for supplying conditioned air at independent flow rates to multiple locations within a motor vehicle, comprising the steps of:
reading individual inputs from each of said multiple locations of said motor vehicle, where each of said inputs corresponds to a desired airflow rate;
adjusting the speed of a single blower employed for the purpose of supplying a passenger compartment with conditioned air in response to said inputs; and
apportioning the output of said blower, based upon said inputs from said multiple locations, between a plurality of air distribution systems for supplying conditioned air to said multiple locations.

13. The method according to claim 12 wherein said individual inputs comprise input signals corresponding to a desired airflow rate for each of said multiple locations.

14. The method according to claim 12 wherein said individual inputs comprise input signals corresponding to desired airflow rate and desired discharge air temperature.

15. The method according to claim 12 wherein said individual inputs comprise input signals corresponding to desired airflow rate, desired discharge air temperature, and desired air discharge location.

16. An airconditioning control system for an automotive vehicle comprising:
input means for receiving individual inputs from the driver and a passenger of said automotive vehicle, with said inputs corresponding to at least desired individual airconditioning airflow rates for said driver and said passenger, said input means further comprising means for generating individual input signals in response to said inputs from said driver and said passenger;
register means for reading said individual input signals from said driver and said passenger;
blower control means for adjusting the speed of a blower supplying conditioned air to said driver and said passenger in response to said individual input signals; and
diverter means for apportioning the output of said blower between a first air distribution system for supplying conditioned air to said driver and a second air distribution system for supplying conditioned air to said passenger, said diverter means being responsive to said individual input signals.

17. An airconditioning control system according to claim 16 wherein said input means comprises at least two separate control panel means with one control panel means operable by said driver and one control panel means operable by said passenger.

18. An airconditioning control system according to claim 17 wherein each of said control panel means comprises control means for selecting airflow rate and desired discharge air temperature.

19. An airconditioning control system according to claim 17 wherein each of said control panel means comprises control means for selecting airflow rate, desired discharge air temperature, and desired discharge air location.

20. An airconditioning control system according to claim 16 wherein said input means comprises a single control panel means operable by said driver and by said passenger.

21. An airconditioning control system according to claim 20 wherein said control panel comprises control means for selecting airflow rate and desired discharge air temperature.

22. An airconditioning control system according to claim 20 wherein said control panel comprises control means for selecting airflow rate, desired discharge air temperature, and desired discharge air location.

23. An airconditioning control system for an automotive vehicle comprising:
a single air supply blower;
a single evaporator core;
a single heater core;
a first control panel, operable by the driver of said automotive vehicle, by which the driver may select a desired airflow rate for conditioned air to be supplied to his zone;
a second control panel, operable by a passenger of said automotive vehicle, by which the passenger may select a desired airflow rate for conditioned air to be supplied to his zone; and
means for governing the speed of said air supply blower and for distributing the output of said blower such that said driver and said passenger will be furnished with independent flows of conditioned air as determined by said selected airflow rates.

* * * * *